United States Patent [19]

Surles

[11] Patent Number: 4,964,465

[45] Date of Patent: Oct. 23, 1990

[54] METHOD EMPLOYING LIQUIDIZED SAND FOR CONTROLLING LOST CIRCULATION OF DRILLING FLUIDS

[75] Inventor: Billy W. Surles, Houston, Tex.

[73] Assignee: Texaco Inc., White Plains, N.Y.

[21] Appl. No.: 432,011

[22] Filed: Nov. 6, 1989

[51] Int. Cl.$^5$ .................. E21B 33/138; E02D 3/12
[52] U.S. Cl. ..................... 166/295; 166/300; 175/72; 405/267; 523/130
[58] Field of Search ............... 166/276, 299, 300, 309; 175/72; 252/8.512; 405/267; 523/130

[56] References Cited

U.S. PATENT DOCUMENTS

| | | | |
|---|---|---|---|
| 2,650,195 | 8/1953 | Cardwell et al. | 252/8.512 X |
| 2,818,230 | 12/1957 | Davis | 252/8.512 X |
| 2,890,169 | 6/1959 | Prokop | 175/72 X |
| 2,986,538 | 5/1961 | Nesbitt et al. | |
| 3,022,824 | 2/1962 | Binkley et al. | 175/72 X |
| 3,150,726 | 9/1964 | Bodine | 175/72 |
| 3,353,601 | 11/1967 | Dollarhide et al. | 175/72 X |
| 3,448,800 | 6/1969 | Parker et al. | 166/294 |
| 3,603,398 | 9/1971 | Hutchison et al. | 166/305.1 |
| 3,724,564 | 4/1973 | Messenger | 175/72 |
| 3,724,565 | 4/1973 | Kelly, Jr. | 175/72 |
| 3,929,191 | 12/1975 | Graham et al. | 166/276 |
| 3,993,117 | 11/1976 | Chevriot et al. | 164/43 |
| 4,173,999 | 11/1979 | Messenger | 166/293 |
| 4,391,643 | 7/1983 | Murphey | 106/74 |
| 4,422,948 | 12/1983 | Corley et al. | |
| 4,474,667 | 10/1989 | Block | |
| 4,498,995 | 2/1985 | Gockel | |
| 4,512,405 | 4/1985 | Sweatman et al. | 175/72 X |
| 4,526,240 | 7/1985 | McKinley et al. | 175/72 |
| 4,635,726 | 1/1987 | Walker | 166/294 |
| 4,704,213 | 11/1987 | Delhommer et al. | 252/8.512 |
| 4,785,884 | 11/1988 | Armbruster | 166/295 X |
| 4,829,100 | 5/1989 | Murphey et al. | 523/131 |
| 4,836,940 | 6/1989 | Alexander | 252/8.512 |

OTHER PUBLICATIONS

R. Chevriot et al., "New Auto-Densifying Fluid Sand," Modern Casting, pp. 37–40, Mar. 1974.

*Primary Examiner*—George A. Suchfield
*Attorney, Agent, or Firm*—Jack H. Park; Kenneth R. Priem; Harold J. Delhommer

[57] ABSTRACT

The disclosed invention is a method for reducing lost circulation in wellbores. In the method, a liquidized sand, comprised of a particulate material, a resin, and a carrier fluid comprising a surfactant mixed with air, is injected into the wellbore. The liquidized sand is then allowed to solidify in the lost circulation area, thereby sealing the area and reducing or eliminating the lost circulation.

6 Claims, No Drawings

4,964,465

METHOD EMPLOYING LIQUIDIZED SAND FOR CONTROLLING LOST CIRCULATION OF DRILLING FLUIDS

BACKGROUND OF THE INVENTION

The present invention relates to the drilling of wells in underground formations. More particularly, the present invention relates to a method and composition for reducing lost circulation of aqueous or oil based drilling fluids.

Drilling fluids, or drilling muds as they are sometimes called, are slurries of clay solids used in the drilling of wells in the earth for the purpose of recovering hydrocarbons and other fluid materials. Drilling fluids have a number of functions, the most important of which are: lubricating the drilling tool and drill pipe which carries the tool, removing formation cuttings from the well, counterbalancing formation pressures to prevent the inflow of gas, oil, or water from permeable rocks which may be encountered at various levels as drilling continues, and holding the cuttings in suspension in the event of a shutdown in the drilling and pumping of the drilling fluid.

For a drilling fluid to perform these functions and allow drilling to continue, the drilling fluid must stay in the borehole. Frequently, undesirable formation conditions are encountered in which substantial amounts, or in some cases, practically all of the drilling fluid may be lost to the formation. Drilling fluid can leave the borehole through large or small fissures or fractures in the formation or through a highly porous rock matrix surrounding the borehole.

Most wells are drilled with the intent of forming a filter cake of varying thickness on the sides of the borehole. The primary purpose of the filter cake is to reduce the large losses of drilling fluid to the surrounding formation. Unfortunately, formation conditions are frequently encountered which may result in unacceptable losses of drilling fluid to the surrounding formation despite the type of drilling fluid employed and filter cake created.

A variety of different substances have been pumped down boreholes in attempts to reduce large losses of drilling fluids to fractures and the like in the surrounding formations. Different forms of cellulose have been commonly added to drilling fluids to increase their viscosity or resistance to flow into the formation. Also, bulk materials such as almond hulls, walnut hulls, coal particles, dried tumbleweed, paper, coarse and fine mica and even pieces of rubber tires, have been added to drilling fluids in an effort to form bridges or mats over cracks or interstices responsible for drilling fluid escape.

Although lost circulation zones frequently are plugged by such bulk materials, successful, and lasting plugging is not assured. Even if bridges or mats are formed, which sometimes they are not, such bulk materials may deteriorate under high drilling pressures and become less effective.

As alternatives to bulk materials, various slugs of polymers or clays have been used to plug lost circulation zones. Cement, such as Plaster of Paris or a silicate, either alone or in combination with bulk materials, has also been used, particularly when other efforts to plug the lost circulation zone have failed. A primary disadvantage of using cement, however, is that heavier cement particles have a tendency to separate from the aqueous slurry in which they are injected into the borehole and consequently become dehydrated at the formation temperature before the lost circulation zone in the formation can be sealed.

There continues to be a need for alternative effective and efficient methods and materials for reducing or eliminating lost circulation of drilling fluids.

SUMMARY OF THE INVENTION

The present invention provides a method for reducing lost circulation of drilling fluids in a wellbore penetrating an underground formation. The method employs liquidized sand. Liquidized sand is comprised of a particulate material, a resin, and a carrier fluid. The carrier fluid is preferably aqueous and includes a surfactant mixed with air.

In applying the method, the liquidized sand is introduced into the wellbore and allowed to solidify in the area of lost circulation. Such solidification of the liquidized sand seals the area of lost circulation, thereby reducing the lost circulation.

DETAILED DESCRIPTION OF THE PREFERRED EMBODIMENT

The present invention provides a method of reducing lost circulation of drilling fluids in a wellbore penetrating an underground formation or reservoir. The reduction in lost circulation is accomplished by sealing the area of lost circulation with a solidified liquidized sand.

Liquidized sand has a number of advantages over known materials used to reduce lost circulation. Liquidized sand is resistant to chemical fluids commonly associated with drilling and production of oil reservoirs, such as mud acid. It is also resistant to high temperatures (about 700° F. or more). Temperatures of about 700° F. may occur in certain steam enhanced oil recovery operations such as "huff & puff" procedures. Liquidized sand has sufficient strength to withstand high drilling pressures, more than bulk materials commonly used, a strength comparable to the strength of cement. Yet, liquidized sand is easier to position than cement. Moreover, liquidized sand does not separate from the carrier fluid and become dehydrated before it can be positioned in the lost circulation area desired to be sealed.

The liquidized sand employed in the method of this invention has liquid characteristics. It is, however, capable of carrying more solids than a liquid slurry is capable of carrying and is easier to position than foam. The liquidized sand contains bubbles which make it look similar to carbonated water. It also has the ability to flow like water so that it may be pumped by standard or common fluid pumps; specialized slurry pumps are not needed.

The liquidized sand is comprised of a particulate material, a resin and a liquid carrier mixed with air. The particulate material is preferably siliceous, such as sand or silica sand, although other particulate materials such as perlite, glass beads, aluminum pieces or beads, steel pieces or beads, and even certain kinds of plastics capable of tolerating subterranean fluids, temperatures and pressures, such as phenlyene sulfide polymer plastics, might also be used. Availability, cost and compatibility with reservoir fluids and conditions are factors considered in determining which particular particulate material should be used.

The resin component of the liquidized sand is preferably an oil soluble, acid catalyzed, polymerizable resin.

A preferred example of such a resin is Quacorr 1300, a partially polymerized furfuryl alcohol available from the Quaker Oats Chemical Company. Other furan resins, including resins produced from the reaction of furfuryl alcohol with urea, formaldehyde, or phenols, may also be suitable. Suitable acid catalysts for such resins, to cure or cause polymerization of such resins, are preferably mineral or organic acid catalysts, although occasionally alkaline catalysts might instead be used. An example of a preferred catalyst, particularly for Quacorr 1300 resin, is butyl acetate containing about 2% chloroacetic acid. The preferred ratio for Quacorr 1300 and this catalyst is 80:20.

Other resins that may be used are thermosetting resins, such as phenolic or phenol-formaldehyde resins of the resol type which require no curing agent, and phenolic resins of the novolac type which usually require a curing agent, amino plast resins, such as urea-formaldehyde and melamine-formaldehyde type resins, which may be cured faster with a curing agent, and epoxy resins.

Of primary importance in choosing a resin is the ability to control the setting time. A sufficient amount of time must be allowed for preparing, storing if necessary, and injecting the composition into the wellbore and area of lost circulation before setting. In this respect, an oligomer type resin is preferred to a monomer type resin because of the increased setting time for the oligomer.

Generally, resin setting time, and consequently setting times for the liquidized sand to solidify and seal or plug the lost circulation zone, decreases as the pH of the liquidized sand is decreased, as by addition of acid catalyst. The table below indicates typical setting times at various pHs.

TABLE I

| pH | Set Time |
| --- | --- |
| 0.5 | 10 minutes |
| 3 | 30 minutes |
| 4 | 1 hour |
| 5 | 3 hours |
| 6 | 24 hours |

The pH and hence the set time of the liquidized sand may also be varied or controlled with base, such as ammonium hydroxide. Adding ammonium hydroxide will increase or raise the pH. Setting times in the range of about 8 to about 24 hours are preferred.

Although acid catalyst will be preferred for most resins that may be employed in this invention, base catalysts may sometimes be used, particularly for formations comprised primarily of limestone.

The resin used in this invention will preferably be applied to the particulate material as a coating, before the material is added to the liquid carrier, rather than added separately to the liquid carrier, although such a separate addition might alternatively be used. A coating application is most preferred when the resin is oil soluble and the liquid carrier is primarily comprised of water. Methods for making resin-coated particles are well known in the art, as typified by Nesbit, et al., U.S. Pat. No. 2,986,538.

The particulate material, preferably resin-coated, is added to a carrier fluid before use in this invention. The carrier fluid will enable the catalyst, if present, to react with or begin the curing of the resin, unless the resin is a thermosetting resin which will require addition of a heated fluid or injection into a formation having higher than ambient temperature for activation of curing. The carrier fluid should preferably be a fluid compatible with the formation fluids and the drilling fluids. The carrier fluid will also preferably be primarily comprised of water or an aqueous solution. The carrier fluid will also comprise a surfactant. The surfactant may be cationic, anionic, or nonionic, but it should be capable of generating bubbles with the carrier fluid and air at ambient temperatures. Examples of surfactants which may be used are soaps, synthetic detergents and proteins. Especially desirable surfactants can be selected from the many alkyl aromatic sulfonic acids. Carbon dioxide, or other solute that is gaseous at formation conditions, may be added to the fluid to help maintain the bubbles at higher temperatures and pressures such as typically found in subterranean formations, if it is desirable to partially seal the lost circulation zone or have a permeable plug of that zone. Chemicals yielding aluminum cations might also be added to the fluid to enhance the permeability of the plug or seal if permeability is desired.

Liquidized sand for use in this invention is prepared by mixing the liquid carrier with air prior to injecting the carrier carrying the particulate material into the wellbore penetrating the formation. Such mixing with air will enable the surfactant to form bubbles in the carrier fluid, which will facilitate carriage of the particulate material in and with the carrier.

Permeability of the liquidized sand, and the time required for the same to cure or set in the lost circulation area may be regulated by varying the concentration of the components of the liquidized sand. For example, a typical mixture might contain 500 parts particulate matter such as silica flour, 80 parts resin such as Quacorr 1300:butyl acetate in an 80:20 ratio, 5 parts surfactant such as dodecyl benzene sulfonic acid, and 300 parts acid solution (enough $H_3PO_4$ to lower the pH to about 0.5) and enough air and/or gas to liquify the mixture.

Preferably, to minimize the economic costs of practicing the invention, the amount of resin used will be minimized, that is, the least amount necessary to accomplish setting of the sand in the lost circulation zone will preferably be used.

In applying the method of this invention, the liquidized sand is preferably prepared at the well site. That is, the particulate material is added to the liquid carrier, preferably at the well site. The liquidized sand is injected into the wellbore penetrating the subterranean formation, allowed or caused to settle into the lost circulation zone, where it is then allowed to solidify. The liquidized sand may be caused to settle in said lost circulation area by circulating said liquidized sand in said wellbore. Circulating drilling fluid is preferably stopped before injection of said liquidized sand and is not resumed until sufficient time has passed for the resin to set or cure, i.e., for the liquidized sand to solidify. Solidification of the liquidized sand in the lost circulation area seals the area against further lost circulation.

The principle of the invention and the best mode for applying that principle have been disclosed. It is to be understood that the foregoing is illustrative only and that variations and modifications can be employed without departing from the scope of the invention in the following claims.

I CLAIM:

1. A method of reducing lost circulation of drilling fluids in a wellbore penetrating an underground formation, comprising:
   preparing a liquidized sand by mixing a resin-coated particulate material with an aqueous carrier fluid comprising a surfactant;
   injecting said liquidized sand into a wellbore;
   causing said liquidized sand to settle into an area of lost circulation; and
   allowing said liquidized sand to solidify in said area of lost circulation.

2. The method of claim 1, wherein said resin-coated particulate material is mixed with an aqueous carrier fluid, such that said mixing is in air and surfactant and air forms bubbles in the carrier fluid.

3. The method of claim 2, wherein said carrier fluid further comprises a solute which helps maintain said bubbles in said carrier solution after injection of the liquidized sand into the wellbore.

4. A method of reducing lost circulation of drilling fluids in a wellbore penetrating an underground formation, comprising:
   adding a particulate siliceous material coated with an oil-soluble, acid catalyzed, polymerizable resin to an aqueous carrier fluid comprising a surfactant;
   mixing said material and carrier fluid in air such that bubbles form in said fluid;
   introducing said mixture into a wellbore;
   circulating said mixture in said wellbore;
   allowing said material to settle into an area of lost circulation; and
   allowing said resin to solidify with said particulate siliceous material in said area of lost circulation.

5. The method of claim 4, wherein said aqueous carrier fluid further comprises an acid catalyst.

6. The method of claim 4, wherein said coating of said particulate siliceous material is comprised of a furan resin and butyl acetate in approximately an 80:20 mixture.

* * * * *